April 9, 1929.  H. G. GILBERT  1,708,612
KNIFE RACK
Filed Jan. 6, 1927
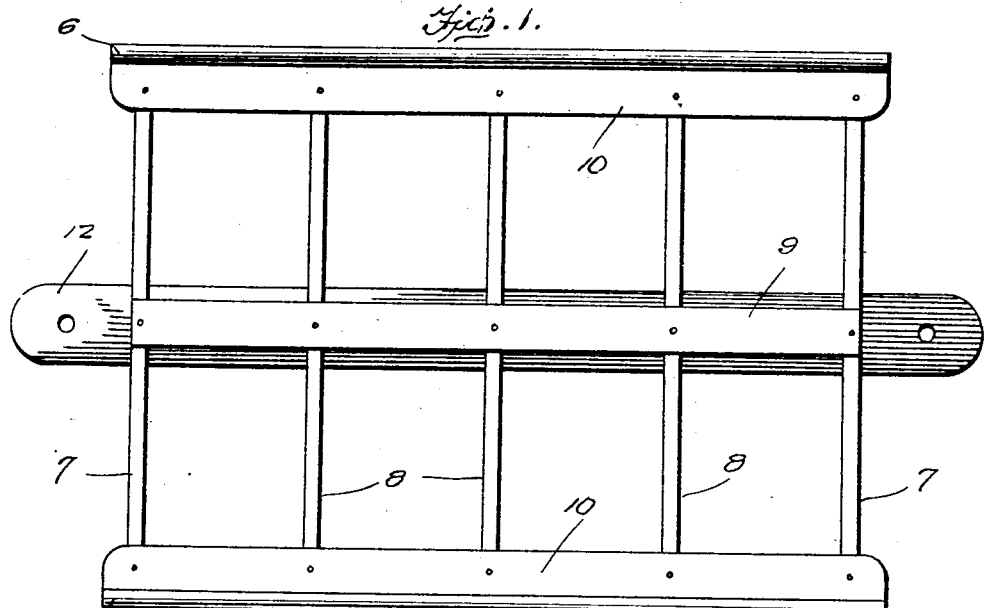
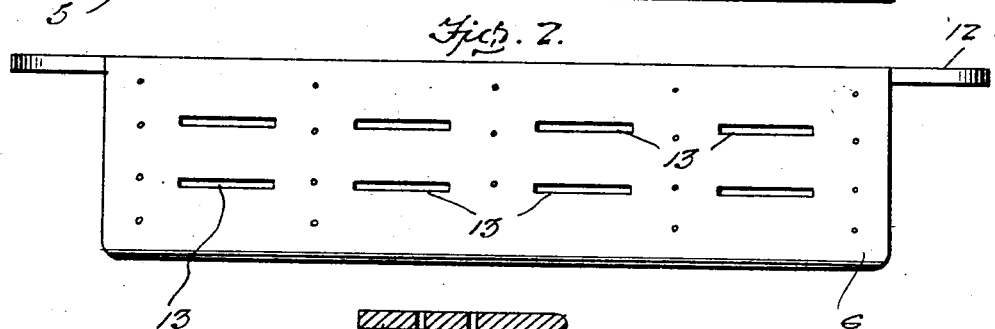
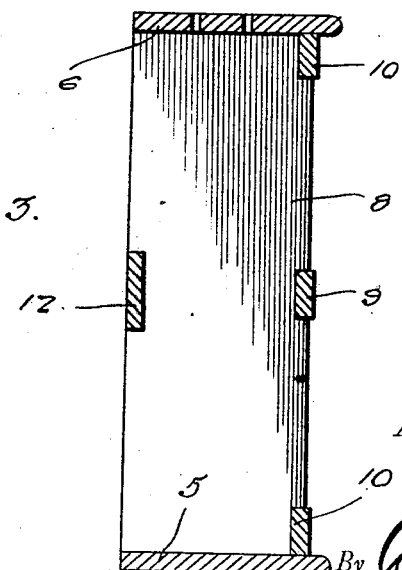
Inventor
Horace Greeley Gilbert
By Clarence A. O'Brien
Attorney Patented Apr. 9, 1929.

1,708,612

UNITED STATES PATENT OFFICE.

HORACE GREELEY GILBERT, OF YOUNGSTOWN, ILLINOIS.

KNIFE RACK.

Application filed January 6, 1927. Serial No. 159,328.

This invention relates to new and useful improvements in racks for knives, and has for its primary object to provide an extremely simple and inexpensive support for a plurality of frequently used knives, especially those employed in the kitchen.

A further and important object is to provide a knife rack of this character wherein the knives may be readily disposed therein, or as equally easily removed therefrom and wherein the knives will be visible while associated with the rack so that the proper one may be removed.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a front elevation of a knife rack constructed in accordance with the present invention.

Figure 2 is a top plan view thereof, and

Figure 3 is a detail vertical section taken through the rack.

Now having particular reference to the drawing wherein there is disclosed the most preferred embodiment of the invention the rack is preferably of rectangular box-like configuration consisting of a bottom and top wall 5 and 6, respectively, a pair of vertical end walls 7—7, and vertically extending partition walls 8 arranged in equally spaced relation with respect to each other and with respect to said end walls 7—7. Extending logitudinally across the center of the front edges of the end walls 7—7 and the partition walls 8 is a strengthening bar 9, while other bars 10—10 are arranged in a similar manner at the lower and upper ends of said partitions and end walls at the front side thereof as clearly indicated in Figure 1.

Arranged across the back edges of the end walls 7—7 and the partition walls 8 at the center thereof is a wide horizontal bar 12 the ends of which extend beyond the end wall 7—7 so as to provide means whereby the rack may be nailed, tacked, or otherwise secured to the wall or other support.

The top wall 6 of the rack within the spaces between the end walls and partition walls is provided with two or more spaced slots 13 through which the blades of the knives are to be disposed, the lower ends thereof resting upon the bottom wall 5.

It will thus be seen that I have provided a highly novel, simple, and efficient knife rack that is well adapted for all the purposes heretofore designated, even though I have herein shown and described the most preferred embodiment of the invention with which I am at this time familiar it is nevertheless to be uderstood that minor changes may be made therein without effecting the spirit and scope of the appended claim.

Having thus described the invention, what I claim is:—

In a knife rack of the class described, a box-like structure including a top, a bottom, and a pair of end walls, spaced partitions arranged vertically between the top and bottom whereby to form a plurality of independent compartments, the partitions being of the same size as the end walls, bars extending across the forward edges of the end walls and the partitions adjacent the top and bottom, the forward edges of the end walls and the partitions being notched to receive the aforementioned bars, an additional bar extending across the forward edges of the end walls and partitions at the intermediate portion of the box-like structure, the intermediate portions of the forward edges of the end walls and partitions being notched to accommodate the last mentioned bar, another bar extending across the rear edges of the end walls and the partitions at the intermediate portions thereof, the read edges of the end walls and partitions being notched to accommodate the last mentioned bar, the top wall of the box like structure being formed with a series of slots for communication with the respective compartments.

In testimony whereof I affix my signature.

HORACE GREELEY GILBERT.